United States Patent
Xi et al.

(10) Patent No.: US 9,153,283 B1
(45) Date of Patent: Oct. 6, 2015

(54) DATA STORAGE DEVICE COMPENSATING FOR HYSTERETIC RESPONSE OF MICROACTUATOR

(71) Applicant: Western Digital Technologies, Inc., Irvine, CA (US)

(72) Inventors: Wei Xi, Mission Viejo, CA (US); Wenlin Zhang, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/501,471

(22) Filed: Sep. 30, 2014

(51) Int. Cl.
*G11B 5/596* (2006.01)
*G11B 20/10* (2006.01)
*G11B 5/09* (2006.01)
*G11B 5/55* (2006.01)

(52) U.S. Cl.
CPC ............ *G11B 20/10305* (2013.01); *G11B 5/09* (2013.01); *G11B 5/5552* (2013.01); *G11B 5/59677* (2013.01)

(58) Field of Classification Search
None
See application file for complete search history.

(56) References Cited

U.S. PATENT DOCUMENTS

| | | | |
|---|---|---|---|
| 2,728,222 A | 12/1955 | Becker et al. | |
| 4,760,358 A | 7/1988 | Inoue | |
| 5,118,982 A | 6/1992 | Inoue et al. | |
| 5,262,643 A | 11/1993 | Hammond et al. | |
| 5,301,558 A | 4/1994 | Livingston et al. | |
| 5,447,051 A | 9/1995 | Hanks et al. | |

(Continued)

FOREIGN PATENT DOCUMENTS

| | | |
|---|---|---|
| UA | 20940 U | 2/2007 |
| UA | 20943 U | 2/2007 |
| WO | 2009128546 A1 | 10/2009 |

OTHER PUBLICATIONS

Model Order Hypothetical Verification of Discrete Preisach Plane: Theory and Atomic Force Microscope Experiment Results, Lei Miao et al, Proceedings of the 8th, World Congress on Intelligent Control and Automation, Jul. 6-9, 2010.*

(Continued)

*Primary Examiner* — Tan X Dinh

(57) ABSTRACT

A data storage device is disclosed comprising a microactuator configured to actuate a head over a disk. A control signal applied to the microactuator is generated based on an input sequence $u(k)$. A Preisach bit map $b_j$ is updated based on the input sequence $u(k)$, wherein the Preisach bit map $b_j$ corresponds to a Preisach plane modeling a hysteretic response of the microactuator. A current compensation value $y_i$ is generated based on an update value generated based on:

$$\sum_j h(j)\hat{b}_j$$

where $h_j$ represents a slice of the Preisach plane and $\hat{b}_j$ is an update bit map based on at least part of the Preisach bit map $b_j$. The current input $u_i$ and the current compensation value $y_i$ are combined to generate the control signal applied to the microactuator.

26 Claims, 8 Drawing Sheets

(56) References Cited

U.S. PATENT DOCUMENTS

| | | | |
|---|---|---|---|
| 5,491,682 A | 2/1996 | Dohmeier et al. | |
| 5,657,188 A * | 8/1997 | Jurgenson et al. | 360/294.3 |
| 5,852,524 A | 12/1998 | Glover et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,088,187 A * | 7/2000 | Takaishi | 360/78.05 |
| 6,091,564 A | 7/2000 | Codilian et al. | |
| 6,094,020 A | 7/2000 | Goretzki et al. | |
| 6,094,973 A | 8/2000 | Novotny | |
| 6,101,058 A * | 8/2000 | Morris | 360/69 |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,160,676 A | 12/2000 | Takaishi | |
| 6,163,434 A * | 12/2000 | Zhang | 360/294.5 |
| RE37,030 E | 1/2001 | Lloyd et al. | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,211,638 B1 * | 4/2001 | Heaton et al. | 318/560 |
| 6,243,223 B1 | 6/2001 | Elliott et al. | |
| 6,249,890 B1 | 6/2001 | Ukani et al. | |
| 6,263,251 B1 | 7/2001 | Rutschmann | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,971 B1 | 4/2002 | Everett | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,493,177 B1 * | 12/2002 | Ell et al. | 360/78.05 |
| 6,496,324 B1 | 12/2002 | Golowka et al. | |
| 6,498,698 B1 | 12/2002 | Golowka et al. | |
| 6,501,606 B2 | 12/2002 | Boutaghou et al. | |
| 6,507,450 B1 | 1/2003 | Elliott | |
| 6,510,752 B1 | 1/2003 | Sacks et al. | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,546,296 B1 | 4/2003 | Hara | |
| 6,549,359 B1 | 4/2003 | Bennett et al. | |
| 6,549,361 B1 | 4/2003 | Bennett et al. | |
| 6,556,028 B1 | 4/2003 | Umanskiy et al. | |
| 6,556,933 B1 | 4/2003 | Sacks et al. | |
| 6,560,056 B1 | 5/2003 | Ryan | |
| 6,563,665 B1 | 5/2003 | Ell | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,639,411 B1 | 10/2003 | Thomsen | |
| 6,690,536 B1 | 2/2004 | Ryan | |
| 6,693,764 B1 | 2/2004 | Sheh et al. | |
| 6,707,633 B2 | 3/2004 | Okuyama et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,563 B2 | 4/2004 | Kobayashi et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,741,417 B2 | 5/2004 | Hsin et al. | |
| 6,747,837 B1 * | 6/2004 | Bennett | 360/78.05 |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,831,807 B2 | 12/2004 | Koso et al. | |
| 6,847,502 B1 | 1/2005 | Codilian | |
| 6,850,383 B1 | 2/2005 | Bennett | |
| 6,850,384 B1 | 2/2005 | Bennett | |
| 6,861,854 B1 | 3/2005 | Guo et al. | |
| 6,867,944 B1 | 3/2005 | Ryan | |
| 6,870,377 B2 | 3/2005 | Thomsen | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,888,694 B2 | 5/2005 | Guo et al. | |
| 6,895,547 B2 | 5/2005 | Eleftheriou et al. | |
| 6,898,039 B2 | 5/2005 | Kobayashi et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,117 B2 | 8/2005 | Huang et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,956,711 B2 | 10/2005 | Hanson et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,123 B1 | 12/2005 | Malang et al. | |
| 6,975,477 B1 | 12/2005 | Hu et al. | |
| 6,975,480 B1 | 12/2005 | Codilian et al. | |
| 6,977,789 B1 | 12/2005 | Cloke | |
| 6,977,793 B2 | 12/2005 | White et al. | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,009,804 B2 | 3/2006 | Sharma et al. | |
| 7,016,134 B1 | 3/2006 | Agarwal et al. | |
| 7,019,938 B2 | 3/2006 | Miyata et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |

(56) References Cited

U.S. PATENT DOCUMENTS

| | | |
|---|---|---|
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,062,698 B2 | 6/2006 | Yang |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,072,134 B1 | 7/2006 | Hirano et al. |
| 7,072,417 B1 | 7/2006 | Burd et al. |
| 7,075,748 B2 | 7/2006 | White et al. |
| 7,079,338 B1 | 7/2006 | Semba et al. |
| 7,079,339 B1 | 7/2006 | Semba et al. |
| 7,088,547 B1 | 8/2006 | Wang et al. |
| 7,095,579 B1 | 8/2006 | Ryan et al. |
| 7,106,552 B2 | 9/2006 | Hirano et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,124,654 B1 | 10/2006 | Davies et al. |
| 7,126,781 B1 | 10/2006 | Bennett |
| 7,136,257 B2 | 11/2006 | Zhang et al. |
| 7,158,329 B1 | 1/2007 | Ryan |
| 7,173,790 B2 | 2/2007 | Kobayashi et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,218,029 B2 | 5/2007 | Murphy |
| 7,224,546 B1 | 5/2007 | Orakcilar et al. |
| 7,248,426 B1 | 7/2007 | Weerasooriya et al. |
| 7,250,738 B1 | 7/2007 | Ting et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,265,936 B1 | 9/2007 | Lee et al. |
| 7,283,321 B1 | 10/2007 | Sun et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,336,434 B2 | 2/2008 | Lille et al. |
| 7,339,761 B1 | 3/2008 | Tu et al. |
| 7,342,740 B1 | 3/2008 | Lee et al. |
| 7,346,832 B2 | 3/2008 | Richardson et al. |
| 7,365,932 B1 | 4/2008 | Bennett |
| 7,385,780 B2 | 6/2008 | Kim et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,392,687 B2 | 7/2008 | Huang et al. |
| 7,395,490 B2 | 7/2008 | Richardson et al. |
| 7,423,837 B2 | 9/2008 | Hutsell |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,474,496 B1 | 1/2009 | Sun et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,538,971 B2 | 5/2009 | Sun et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,940 B2 | 8/2009 | Lee et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,657,816 B2 | 2/2010 | Cohen et al. |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,768,276 B2 | 8/2010 | Yao |
| 7,800,853 B1 | 9/2010 | Guo et al. |
| 7,800,856 B1 | 9/2010 | Bennett et al. |
| 7,800,857 B1 | 9/2010 | Calaway et al. |
| 7,814,393 B2 | 10/2010 | Kyung et al. |
| 7,826,170 B2 | 11/2010 | Semba |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,869,157 B2 | 1/2011 | Nagashima et al. |
| 7,876,522 B1 | 1/2011 | Calaway et al. |
| 7,876,523 B1 | 1/2011 | Panyavoravaj et al. |
| 7,913,149 B2 | 3/2011 | Gribok et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,940,490 B2 | 5/2011 | Shelor |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |

(56) References Cited

U.S. PATENT DOCUMENTS

| | | |
|---|---|---|
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,322,235 B1 | 12/2012 | Keopuang et al. |
| 8,335,049 B1 | 12/2012 | Liu et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,467,144 B2 | 6/2013 | Lim et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,792 B1 | 9/2013 | Burd et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,547,657 B1 | 10/2013 | Liu et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,383 B1 | 12/2013 | Wang et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,254 B1 | 5/2014 | Tang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2001/0036034 A1 | 11/2001 | Chang et al. |
| 2002/0096969 A1 | 7/2002 | Murphy |
| 2002/0176201 A1 | 11/2002 | Hsin et al. |
| 2003/0030937 A1 | 2/2003 | Kohso et al. |
| 2003/0037298 A1 | 2/2003 | Eleftheriou et al. |
| 2003/0065992 A1 | 4/2003 | Yang |
| 2003/0076121 A1 | 4/2003 | Guo et al. |
| 2004/0004781 A1 | 1/2004 | Kobayashi et al. |
| 2004/0098659 A1 | 5/2004 | Bjerke et al. |
| 2004/0228027 A1 | 11/2004 | Zhang et al. |
| 2005/0146807 A1 | 7/2005 | Huang et al. |
| 2005/0204253 A1 | 9/2005 | Sukhobok et al. |
| 2005/0216821 A1 | 9/2005 | Harada |
| 2005/0246617 A1 | 11/2005 | Kyung et al. |
| 2006/0036925 A1 | 2/2006 | Kyung et al. |
| 2006/0036933 A1 | 2/2006 | Blankenship et al. |
| 2006/0171062 A1 | 8/2006 | Hirano et al. |
| 2007/0223136 A1 | 9/2007 | Hutsell |
| 2008/0129305 A1 | 6/2008 | Perryman et al. |
| 2008/0165444 A1 | 7/2008 | Zafer |
| 2008/0310046 A1 | 12/2008 | Menegoli et al. |
| 2009/0249159 A1 | 10/2009 | Lee et al. |
| 2009/0303839 A1 | 12/2009 | Narayanan et al. |
| 2009/0310250 A1 | 12/2009 | Nagashima et al. |
| 2010/0035085 A1 | 2/2010 | Jung et al. |
| 2010/0037674 A1 | 2/2010 | Yashchuk et al. |
| 2010/0100788 A1 | 4/2010 | Yang et al. |
| 2010/0238588 A1 | 9/2010 | Drouin et al. |
| 2011/0216437 A1 | 9/2011 | Mathur et al. |
| 2011/0299197 A1 | 12/2011 | Eguchi |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0188277 A1 | 7/2013 | Matsuzawa |

OTHER PUBLICATIONS

Hysteresis Scaling by Defined Hysteron Pattern in Preisach Model, Teerawat Monnor et al, Proceedings of the World Congress on Engineering and Computer Science 2012, vol. II, Oct. 24-26, 2012.*

Clayton, G., et al., "A Review of Feedforward Control Approaches in Nanopositioning for High-Speed SPM," Journal of Dynamic Systems, Measurement, and Control, www.asme.org., downloaded on Jan. 22, 2010, vol. 131, pp. 061101-1 to 061101-19, Oct. 28, 2009.

Conway, R., et al., "Robust Track-Following Controller Design in Hard Disk Drives Based on Parameter Dependent Lyapunov Functions," IEEE Transactions on Magnetics, Apr. 2010, vol. 46 (4), pp. 1060-1068.

Franklin, G., et al., Digital Control Dynamic Systems, 1997, pp. 56-61.

Gao, Z., et al., "Discrete-Time Proportional and Integral Observer and Observer-Based Controller for Systems with Both Unknown Input and Output Disturbances," Optimal Control Applications and Methods, 2008, vol. 29 (3), pp. 171-189.

Ge, P., et al., "Tracking Control of a Piezoceramic Actuator," IEEE Transactions on Control Systems Technology, vol. 4 (3), May 1996, pp. 209-216.

Iyer, R., et al., "Control of Hysteretic Systems Through Inverse Compensation," IEEE Control Systems Magazine, vol. 29 (1), Feb. 2009, pp. 83-99.

Kim, Y., et al., "Servo Design for High-TPI Computer Disk Drives Using a Delayaccommodating State Estimator," Microsystem Technologies, 2005, vol. 11 (8), pp. 696-701.

(56) References Cited

OTHER PUBLICATIONS

Kobayshi, M., et al., "Adaptive Control of Dual-Stage Actuator for Hard Disk Drives," Proceeding of the 2004 American Control Conference, Boston, Massachusetts, Jun. 30-Jul. 2, 2004.

Krstic, M., et al., "Nonlinear and Adaptive Control Design," New York: Wiley, 1995, pp. 388-393.

Leiner, B., "LDPC Codes—a brief Tutorial," Stud. ID: 53418L, Apr. 8, 2005, pp. 1-9.

Song, G., et al., "Tracking Control of a Piezoceramic Actuator With Hysteresis Compensation Using Inverse Preisach Model," IEEE/ASME Transactions on Mechatronics, vol. 10 (2), Apr. 2005, pp. 198-209.

Tan, X., et al., "Adaptive Identification and Control of Hysteresis in Smart Materials," IEEE Transactions on Automatic Control, vol. 50 (6), Jun. 2005, pp. 827,839.

Tan, Y., et al., "Hysteresis Compensation of Piezoelectric Actuators in Dual-Stage Hard Disk Drives," 8th Asian Control Conference (ASCC), May 15-18, 2011, pp. 1024-1029.

Shreekant Gayaka, et al., U.S. Appl. No. 13/363,228, filed Jan. 31, 2012, 27 pages.

Yanan Huang, et al., U.S. Appl. No. 13/720,832, filed Dec. 19, 2012, 24 pages.

Shreekant Gayaka, et al., U.S. Appl. No. 13/923,024, filed Jun. 20, 2013, 19 pages.

Alexander Babinski, et al., U.S. Appl. No. 12/606,819, filed Oct. 27, 2009, 24 pages.

\* cited by examiner

Prior Art

DATA STORAGE DEVICE COMPENSATING FOR HYSTERETIC RESPONSE OF MICROACTUATOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
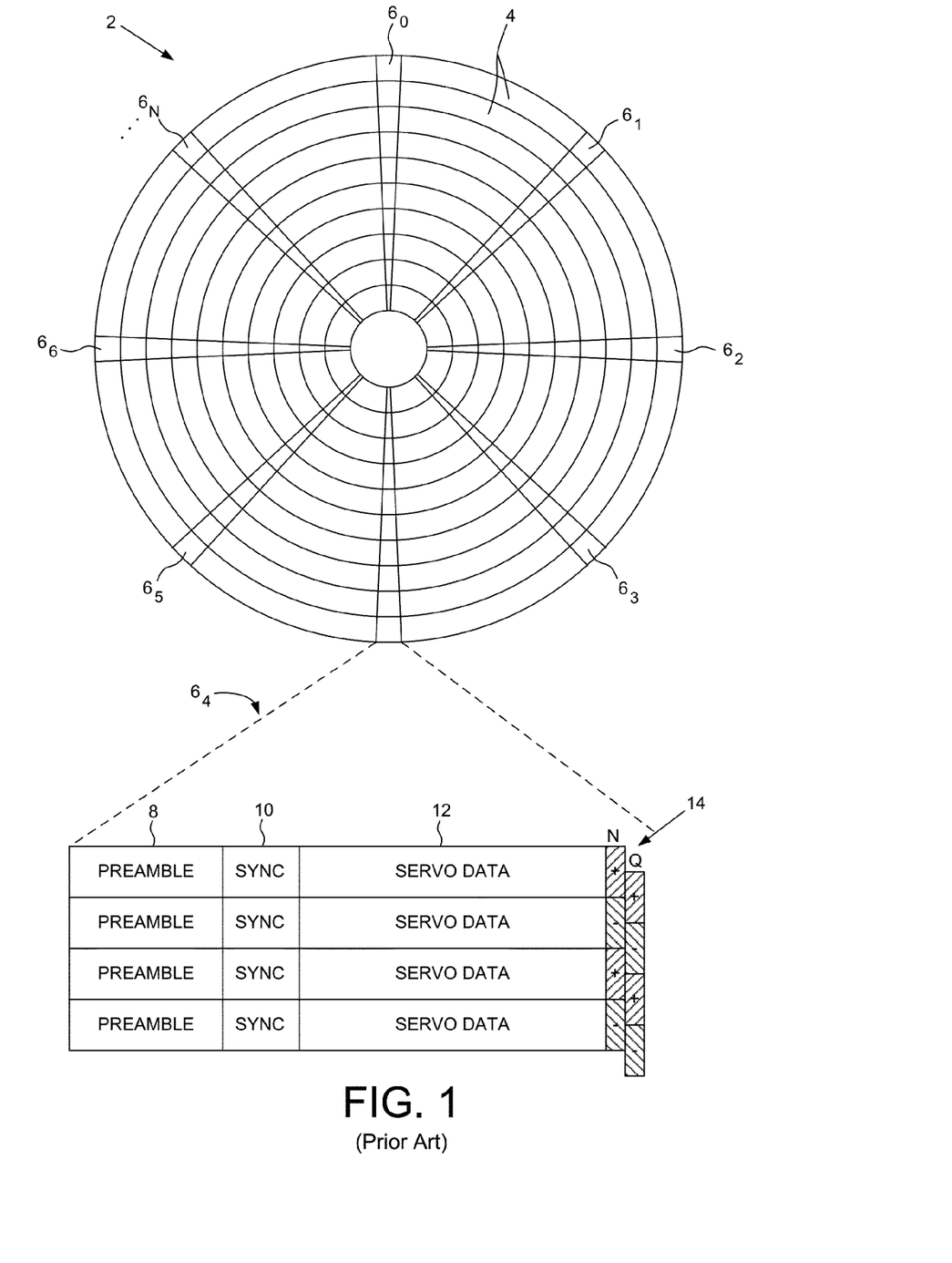
FIG. 1 shows a prior art disk format comprising servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo data 12 and servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

DETAILED DESCRIPTION

Figure 2A:
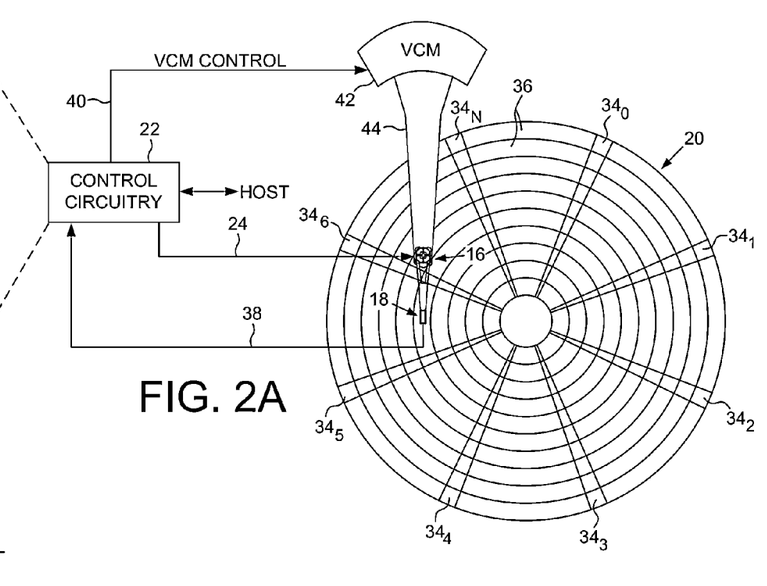
FIG. 2A shows a data storage device in the form of a disk drive according to an embodiment comprising a microactuator configured to actuate a head over a disk.
Figure 2B:
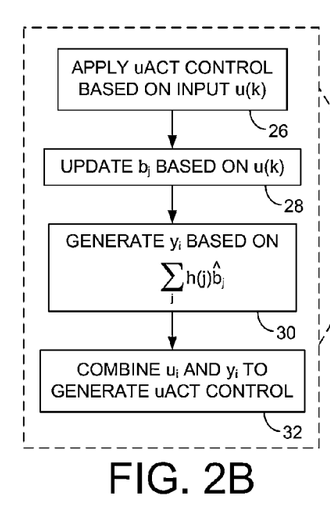
FIG. 2B is a flow diagram according to an embodiment wherein a compensation value is generated based on a Preisach bit map.

FIG. 2A shows a data storage device in the form of a disk drive according to an embodiment comprising a microactuator 16 configured to actuate a head 18 over a disk 20. The disk drive further comprises control circuitry 22 configured to execute the flow diagram of FIG. 2B, wherein a control signal 24 is applied to the microactuator based on an input sequence u(k) (block 26). A Preisach bit map $b_j$ is updated based on the input sequence u(k) (block 28), wherein the Preisach bit map $b_j$ corresponds to a Preisach plane modeling a hysteretic response of the microactuator. A current compensation value $y_i$ is generated (block 30) based on an update value generated based on:

$$\sum_j h(j)\hat{b}_j$$

where $h_j$ represents a slice of the Preisach plane and $\hat{b}_j$ is an update bit map based on at least part of the Preisach bit map $b_j$. The current input $u_i$ and the current compensation value $y_i$ are combined to generate the control signal applied to the microactuator (block 32).

In the embodiment of FIG. 2A, the disk 20 comprises a plurality of servo sectors $34_0$-$34_N$ that define a plurality of servo tracks 36, wherein data tracks are defined relative to the servo tracks at the same or different radial density. The control circuitry 22 processes a read signal 38 emanating from the head 18 to demodulate the servo sectors $34_0$-$34_N$ and generate a position error signal (PES) representing an error between the actual position of the head and a target position relative to a target track. The control circuitry 22 filters the PES using a suitable compensation filter to generate a control signal 40 applied to a voice coil motor (VCM) 42 which rotates an actuator arm 44 about a pivot in order to actuate the head 18 radially over the disk 20 in a direction that reduces the PES. The control circuitry 22 also generates the control signal 24 applied to the microactuator 16 in order to actuate the head 18 in fine movements to further reduce the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

Figure 2C:
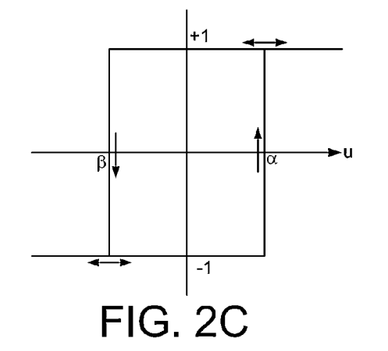
FIG. 2C shows a hysteretic response of the microactuator.
Figure 2D:
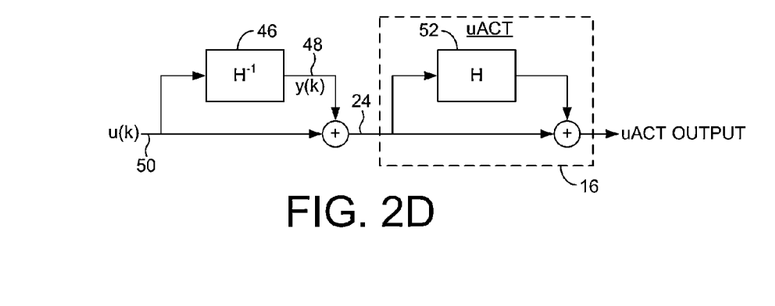
FIG. 2D shows control circuitry according to an embodiment wherein the compensation values compensate for the hysteretic response of the microactuator.
Figure 3A:
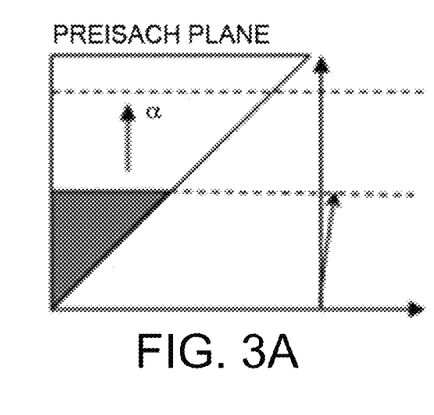
FIGS. 3A-3E illustrate how the Preisach plane can model the position of a microactuator that exhibits hysteresis.
Figure 3B:
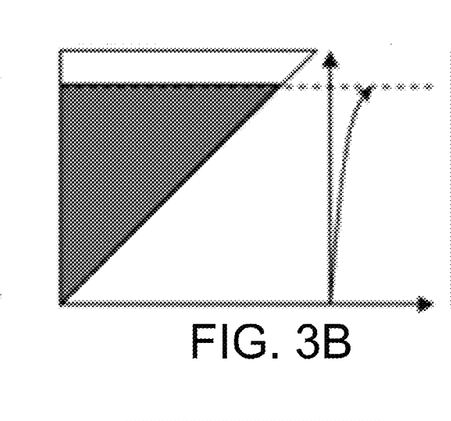
Figure 3C:
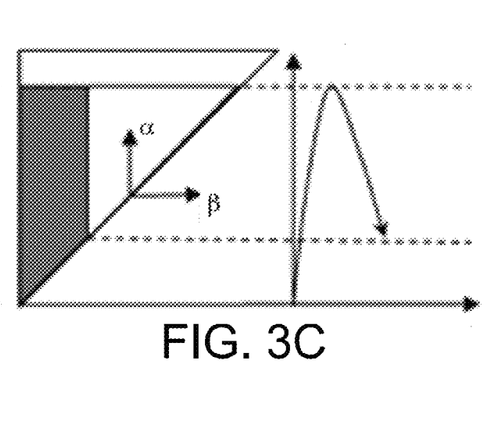
Figure 3D:
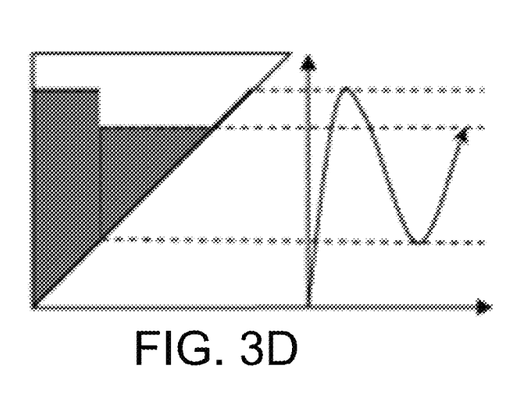
Figure 3E:
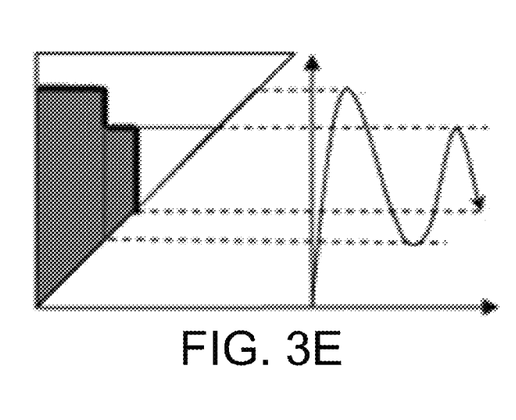

FIG. 2C shows an example hysteretic response of the microactuator 16 wherein the position of the microactuator is determined not only by the current control signal 24 but also on a past history of the control signal 24. FIG. 2D shows control circuitry according to an embodiment wherein a compensator 46 generates compensation values y(k) 48 that are combined with an input sequence u(k) 50 (based on the PES) to generate the control signal 24 in a manner that compensates for the hysteretic response 52 of the microactuator 16. In one embodiment, the compensator 46 may generate the compensation values y(k) 48 as the negative of the hysteretic response 52 of the microactuator 16, and in other embodiments the compensator 46 may implement a more sophisticated algorithm based on the hysteretic response 52 of the microactuator 16. Accordingly, in one embodiment the hysteretic response 52 of the microactuator 16 is measured, and then the compensator 46 is configured based on the measured hysteretic response.

The hysteretic response 52 of the microactuator 16 may be modeled using a Preisach plane as shown in FIGS. 3A-3E which is represented by the upper triangle with index $\alpha$ and $\beta$, respectively. The Preisach model of hysteresis generalizes hysteresis loops as the parallel connection of independent relay hysterons. The input history $\{u_0, u_1, \ldots u_n\}$ projects onto the plane and is recorded as a trajectory T ($\alpha$, $\beta$). The position of the microactuator can be calculated as the integral of the shaded area:

$$y_m(t) = \int\int_{T(\alpha \geq \beta)} \mu(\alpha, \beta) \cdot \hat{\gamma}_{\alpha,\beta}[u(t)] \, d\alpha \, d\beta$$

The position of the microactuator $y_m(t)$ is the integration of its previous trajectory T($\alpha$, $\beta$) on the predefined weighted density plane with weight $\mu(\alpha, \beta)$, multiplied by the hysteron operator $\hat{\gamma}_{\alpha,\beta}[u(t)]$ defined as $$\hat{\gamma}_{\alpha,\beta}[u(t)] = \begin{Bmatrix} 1, \text{ for increasing } u(t) \\ -1, \text{ for decreasing } u(t) \end{Bmatrix}$$

Referring to the example shown in FIGS. 3A-3E, the shaded area in the triangle increases as the input increases (hysterons turn on), and the shaded area in the triangle decreases as the input decreases (hysterons turn off).

Figure 4A:
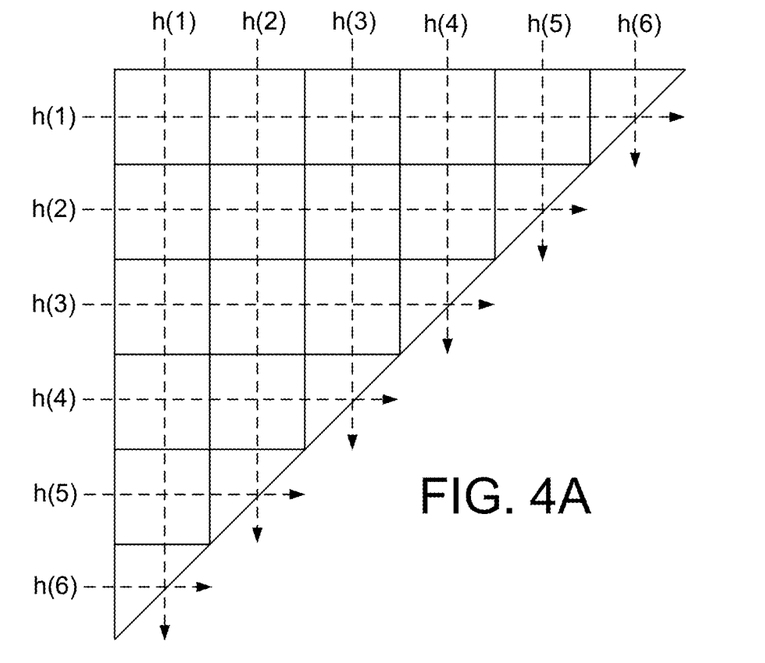
FIG. 4A shows an embodiment wherein the Preisach plane is quantized into horizontal and vertical slices.
Figure 4B:
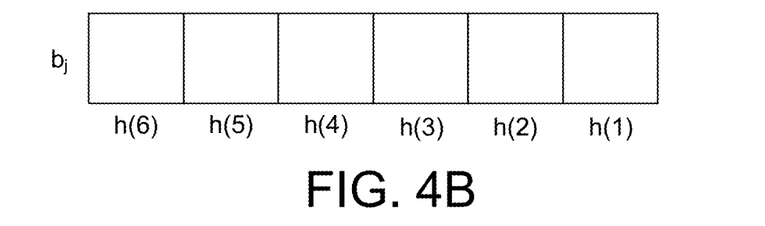
FIG. 4B shows an example embodiment of a Preisach bit map.

FIG. 4A shows an embodiment wherein the continuous time Preisach plane described above is quantized into discrete hysterons which are combined to form horizontal and vertical slices $\{h_0, h_1, \ldots h_n\}$ of the Preisach plane. In the example shown in FIG. 4A, the quantization level is 6 by 6; however, any suitable level of quantization may be employed. In some embodiments, the Preisach plane may be symmetric such that the values representing the horizontal slices are equal to the values representing the vertical slices; however, in other embodiments the Preisach plane may be asymmetric such that the horizontal slices do not equal the vertical slices. FIG. 4B shows a Preisach bit map $b_j$ that represents the state of the Preisach plane and is described in greater detail with reference to the example shown in FIGS. 5A-5F.

Figure 5A:
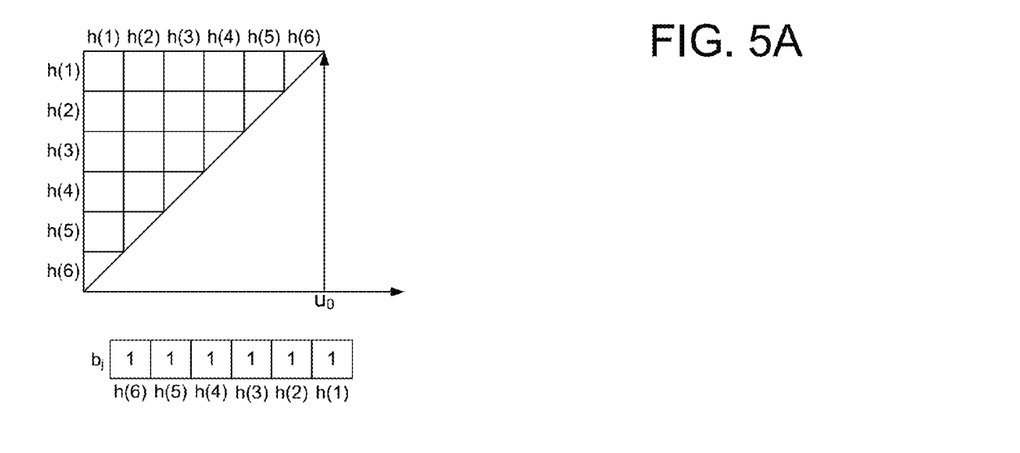
FIGS. 5A-5F illustrate how the compensation values are generated based on the Preisach plane and Preisach bit map according to an embodiment.
Figure 5B:
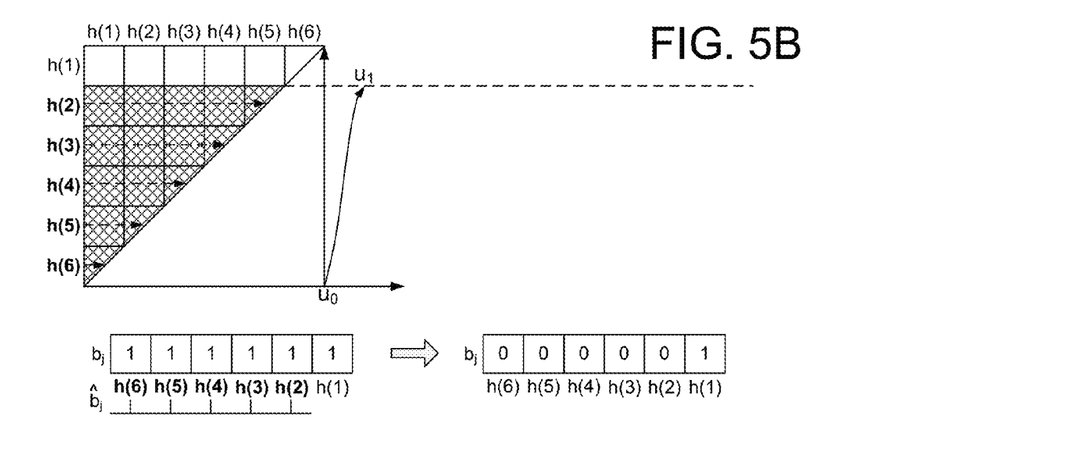

FIG. 5A shows an initial state of the Preisach plane as well as the Preisach bit map $b_j$ wherein each cell is initialized to a 1-bit which represents an initial position of the microactuator (e.g., center of the stroke with $u_0=0$). FIG. 5B shows an example of the microactuator position changing due to an increase in the input signal to $u_1=5$ resulting in horizontal slices [h(6),h(5),h(4),h(3),h(2)] of the Preisach plane turning on. Accordingly, the position of the microactuator increases based on:

$$\sum_j h(j)\hat{b}_j$$

where $\hat{b}_j$ is the update bit map based on at least part of the Preisach bit map $b_j$ as illustrated in FIG. 5B. In this embodiment, since the previous input $u_{i-1}$ is less than the current input $u_i$, the control circuitry generates the update bit map $\hat{b}_j$ based on the $u_i$-$u_{i-1}$ high order bits of the Preisach bit map $b_j$ having a target value of 1 (i.e., bits 6-2 of the update bit map $\hat{b}_j$ are set to 1 to generate the updated position based on the above equation). The control circuitry then updates the Preisach bit map $b_j$ by inverting these 1-bits to 0-bits as illustrated in FIG. 5B.

Figure 5C:
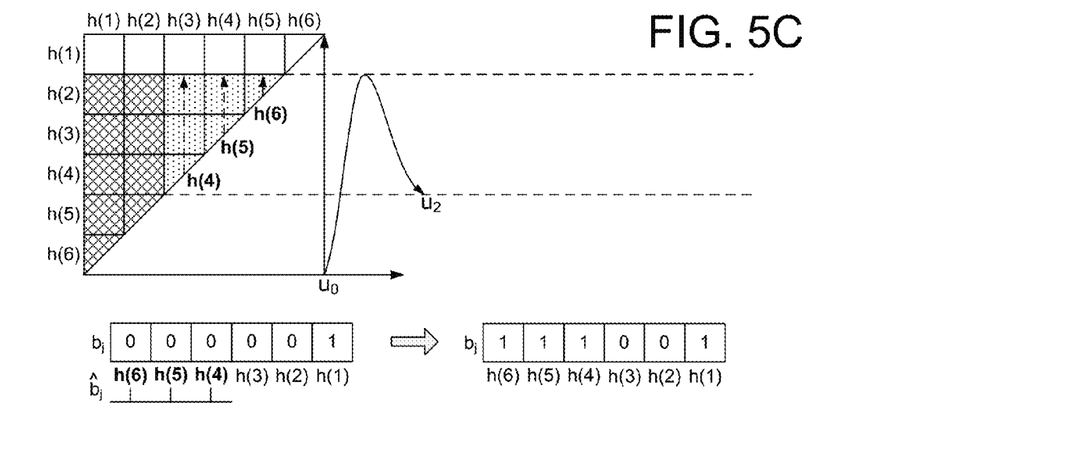
Figure 5D:
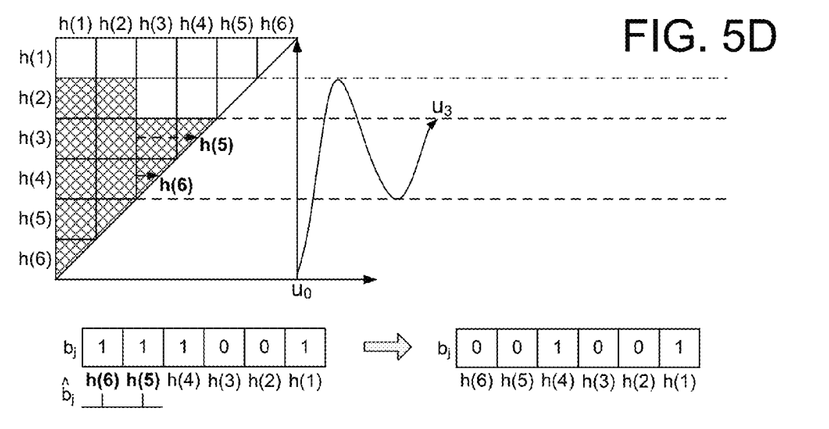
Figure 5E:
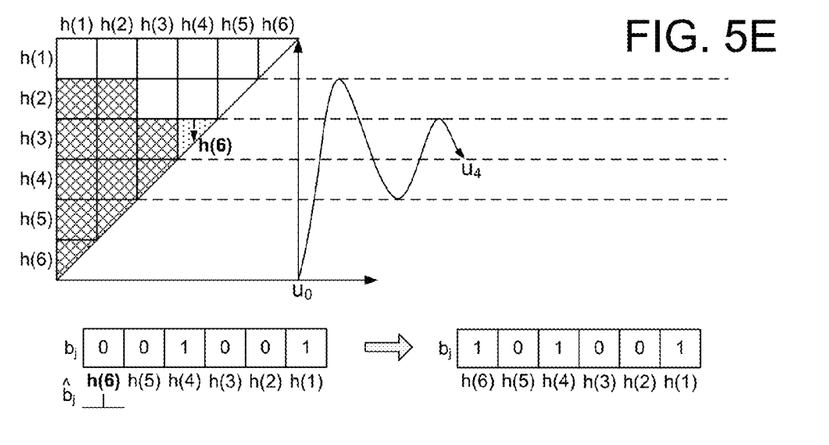
Figure 5F:
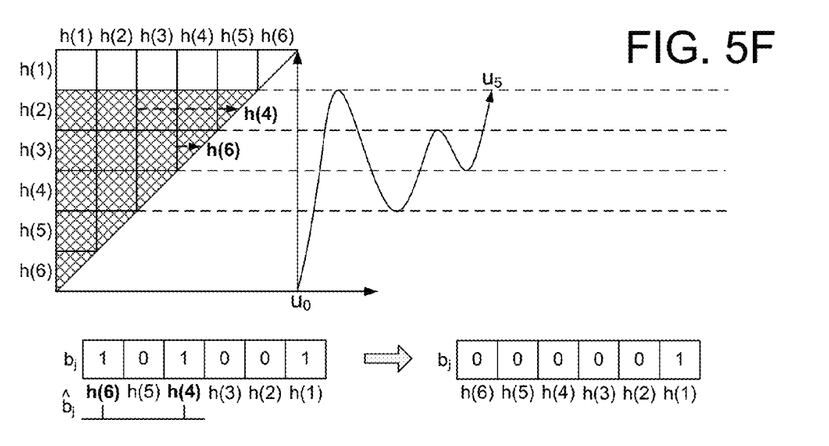

FIG. 5C shows an example of the microactuator position changing due to a decrease in the input signal to $u_2=2$ resulting in vertical slices [h(6),h(5),h(4)] of the Preisach plane turning off. Accordingly, the position of the microactuator decreases based on:

$$\sum_j h(j)\hat{b}_j$$

where $\hat{b}_j$ is the update bit map based on at least part of the Preisach bit map $b_j$ as illustrated in FIG. 5C. In this embodiment, since the previous input $u_{i-1}$ is greater than the current input $u_i$, the control circuitry generates the update bit map $\hat{b}_j$ based on the $u_i$-$u_{i-1}$ high order bits of the Preisach bit map $b_j$ having a target value of 0 (i.e., bits 6-4 of the update bit map $\hat{b}_j$ are set to 1 to generate the updated position based on the above equation). The control circuitry then updates the Preisach bit map $b_j$ by inverting these 0-bits to 1-bits as illustrated in FIG. 5C.

Figure 6:
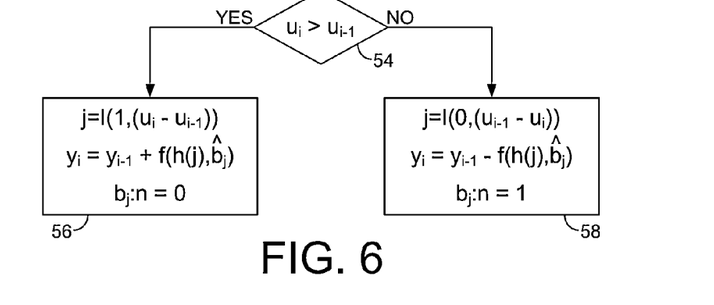
FIG. 6 is a flow diagram according to an embodiment for generating the compensation values generated based on the Preisach plane and Preisach bit map according to an embodiment.

FIGS. 5C-5F illustrate how the position of the microactuator is updated, as well as how the update bit map $\hat{b}_j$ is generated and the Preisach bit map $b_j$ is updated as the input sequence u(k) changes. In one embodiment, the compensation values y(k) 48 are generated as shown in the flow diagram of FIG. 6 which is understood from the above described process for estimating the hysteretic response 52 of the microactuator. When the previous input $u_{i-1}$ is less than the current input $u_i$ at block 54, the current compensation value $y_i$ is generated by adding the update value to the previous compensation value $y_{i-1}$ at block 56. When the previous input $u_{i-1}$ is greater than the current input $u_i$ at block 54, the current compensation value $y_i$ is generated by subtracting the update value from the previous compensation value $y_{i-1}$ at block 58. At block 56 the operator j=l(1,k) returns the index in the Preisach bit map of the last kth bit having a value of 1, and at block 58 the operator j=l(0,k) returns the index in the Preisach bit map of the last kth bit having a value of 0.

Any suitable technique may be employed to measure the hysteretic response of the microactuator 16 and to generate the corresponding Preisach plane described above. In one embodiment, a sinusoid is injected into a control signal applied to the microactuator 16, and a sinusoidal response of the microactuator is measured. In one embodiment, slices of the Preisach plane are generated based on the measured sinusoidal response.

Figure 7A:
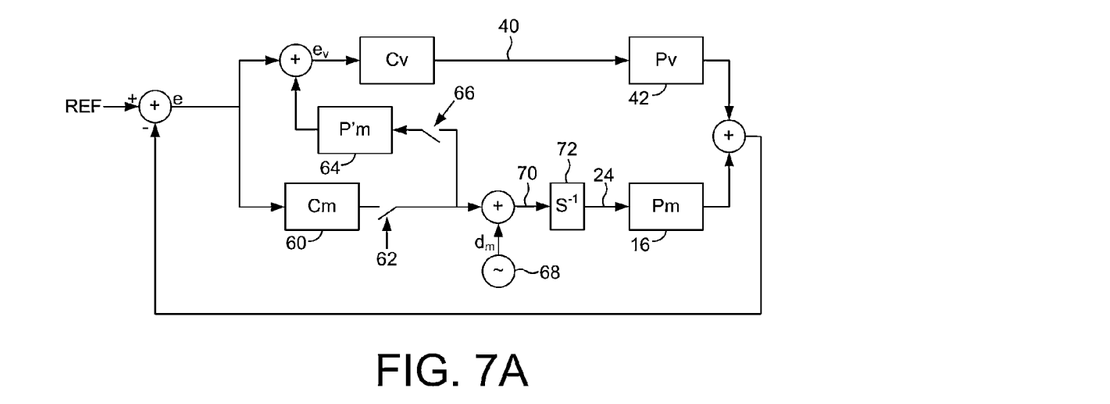
FIG. 7A shows control circuitry according to an embodiment wherein the slices of the Preisach plane are generated by injecting a sinusoid into a control signal applied to the microactuator and measuring a sinusoidal response of the dual stage actuator (DSA) servo loop.

An example of this embodiment is understood with reference to the dual stage actuator (DSA) servo loop shown in FIG. 7A which comprises a voice coil motor (VCM) servo loop for controlling the VCM 42 and a microactuator servo loop for controlling the microactuator 16. When measuring the hysteretic response of the microactuator 16, a microactuator compensator 60 in the microactuator servo loop is disabled by opening switch 62, and a model of the microactuator 64 is disabled by opening switch 66. After disabling the microactuator compensator 60, a sinusoid 68 is injected into control signal 70, where the sinusoid 68 is of the form:

$$d_m(t) = r \sin(\omega t) + \phi$$

where r represents an amplitude and $\phi$ represents a DC offset of the sinusoid. The sinusoidal response of the microactuator $y_m(t)$ may be represented as:

$$y_m(t) = K[d_m(t) + \tilde{H}(d_m(t))]$$

where K represents a gain of the microactuator, $\tilde{H}(d_m(t)) = S^{-1} H(d_m(t))$ represents a residue hysteretic response after static non-linear compensation 72 of the microactuator, and $H(d_m(t))$ represents the original hysteretic response of the microactuator based on the past input history. In one embodiment, the hysteretic response of the microactuator may be estimated by computing a discrete Fourier transform (DFT) of the microactuator response $Y_m$ after injecting the above input sinusoid as:

$$|\tilde{H}(j\omega)| = \frac{Y_m - KD_m}{K}$$

Accordingly by injecting a sinusoid 68 into the control signal 70 and measuring the sinusoidal response of the microactuator, the hysteretic response of the microactuator may be estimated based on the above equation. In one embodiment, by varying the amplitude r (and optionally the offset $\phi$) of the input sinusoid 68 the entire Preisach plane described above may be characterized.

Figure 7B:
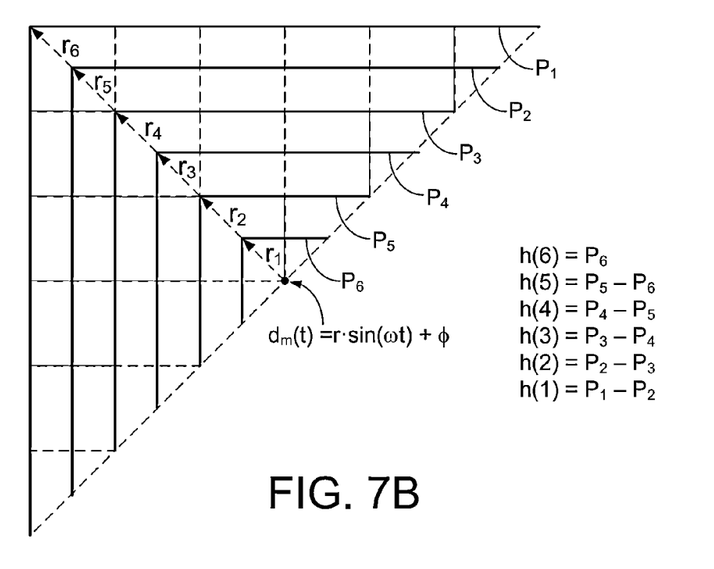
FIG. 7B illustrates how the slices of the Preisach plane are generated by incrementally increasing the amplitude of the sinusoid injected into the control signal applied to the microactuator.

In one embodiment, the Preisach plane may be symmetric meaning that the horizontal slices shown in FIG. 4A are equal in value to the vertical slices (and the hysterons of the Preisach plane have the same value). In this embodiment, the Preisach plane may be characterized by measuring the hysteretic response of the microactuator at varying amplitudes r of the input sinusoid 68, and at a fixed offset $\phi$ corresponding to the middle coordinate along the diagonal as shown in FIG. 7B. At a first amplitude $r_1$ of the input sinusoid a first triangle area $P_6$ of the Preisach plane may be generated as described above, where this area $P_6$ corresponds to the h(6) slice (horizontal and vertical) of the Preisach plane. At the second amplitude $r_2$ of the input sinusoid a second triangle area $P_5$ of the Preisach plane may be measured as described above, where the h(5) slice corresponds to $P_5-P_6$. This process is repeated until all six slices of the Preisach plane have been generated as illustrated in FIG. 7B.

Figure 8A:
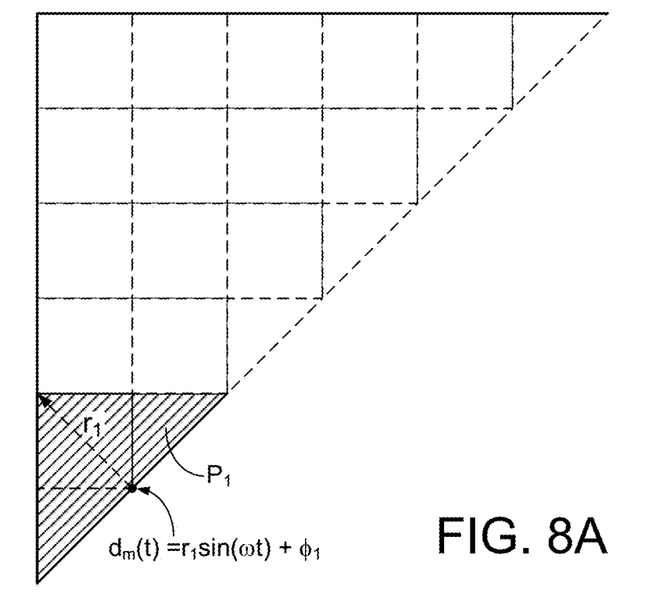
FIGS. 8A and 8B illustrate an embodiment for generating the Preisach plane when the horizontal and vertical slices are asymmetric.
Figure 8B:
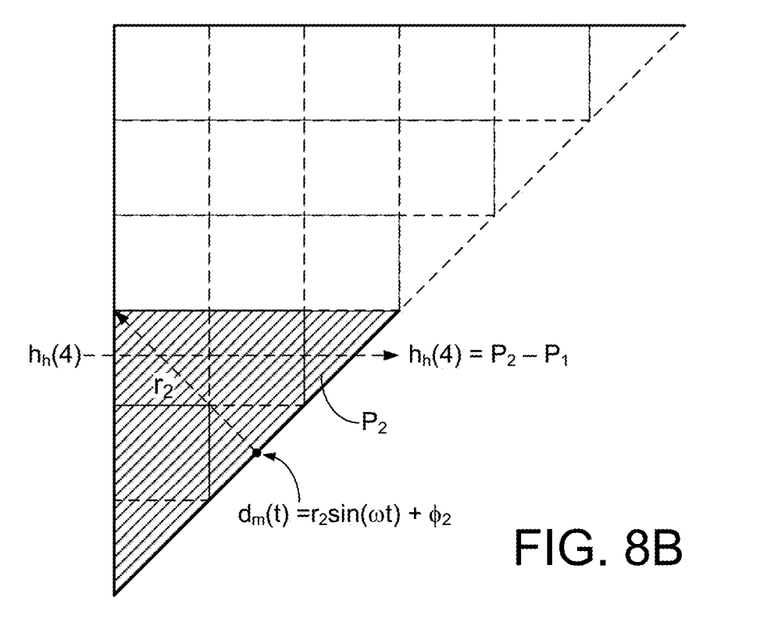

In one embodiment, the hysteretic response of the microactuator 16 may correspond to an asymmetric Preisach plane such that the horizontal and vertical slices shown in FIG. 4A may have different values. In order to characterize an asymmetric Preisach plane, in one embodiment both the amplitude r and the offset $\phi$ of the input sinusoid 68 shown in FIG. 7A are varied. An example of this embodiment is illustrated in FIGS. 8A and 8B, wherein in FIG. 8A the input sinusoid 68 has a first amplitude $r_1$ and a first offset $\phi_1$ in order to measure the triangle area $P_1$ of the Preisach plane. In FIG. 8B the input sinusoid 68 has a second amplitude $r_2$ and as second offset $\phi_2$ in order to measure the triangle area $P_2$ of the Preisach plane. The horizontal slice $h_h(4)$ of the Preisach plane may then be generated as $P_2-P_1$. A similar process may be used to measure each of the horizontal and vertical slices of the Preisach plane, and in one embodiment a similar process may be used to measure each hysteron in the Preisach plane in the event that each hysteron has a different value.

Any suitable microactuator may be employed to actuate the head over the disk, such as a piezoelectric actuator. In addition, the microactuator may actuate the head over the disk in any suitable manner, such as by actuating a suspension relative to the actuator arm, or by actuating a head gimbal assembly (HGA) that couples a slider to the suspension.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head;
   a microactuator configured to actuate the head over the disk; and
   control circuitry configured to:
      generate a control signal applied to the microactuator based on an input sequence u(k);
      update a Preisach bit map $b_j$ based on the input sequence u(k), wherein the Preisach bit map $b_j$ corresponds to a Preisach plane modeling a hysteretic response of the microactuator;
      generate a current compensation value $y_i$ based on an update value generated based on:

$$\sum_j h(j)\hat{b}_j$$

where $h_j$ represents a slice of the Preisach plane and $\hat{b}_j$ is an update bit map based on at least part of the Preisach bit map $b_j$; and
   combine a current input $u_i$ and the current compensation value $y_i$ to generate the control signal applied to the microactuator.

2. The data storage device as recited in claim 1, wherein the compensation value compensates for the hysteretic response of the microactuator.

3. The data storage device as recited in claim 1, wherein when a previous input $u_{i-1}$ is less than the current input $u_i$, the control circuitry is further configured to generate the current compensation value $y_i$ by adding the update value to a previous compensation value $y_{i-1}$.

4. The data storage device as recited in claim 1, wherein when a previous input $u_{i-1}$ is less than the current input $u_i$, the control circuitry is further configured to generate the update bit map $\hat{b}_j$ based on $u_i$-$u_{i-1}$ bits of the Preisach bit map $b_j$.

5. The data storage device as recited in claim 4, wherein the $u_i$-$u_{i-1}$ bits of the Preisach bit map $b_j$ comprise high order bits of the Preisach bit map $b_j$ having a target value.

6. The data storage device as recited in claim 5, wherein the $u_i$-$u_{i-1}$ bits of the Preisach bit map $b_j$ comprise the high order bits of the Preisach bit map $b_j$ having a target value of 1.

7. The data storage device as recited in claim 6, wherein after generating the update value the control circuitry is further configured to clear m high order bits of the Preisach bit map $b_j$ where m represents the $u_i$-$u_{i-1}$ high order bits of the Preisach bit map $b_j$ having a target value of 1 plus the intervening 0 bits.

8. The data storage device as recited in claim 1, wherein when a previous input $u_{i-1}$ is greater than the current input $u_i$, the control circuitry is further configured to generate the current compensation value $y_i$ by subtracting the update value from a previous compensation value $y_{i-1}$.

9. The data storage device as recited in claim 1, wherein when a previous input $u_{i-1}$ is greater than the current input $u_i$, the control circuitry is further configured to generate the update bit map $\hat{b}_j$ by inverting at least part of the Preisach bit map $b_j$.

10. A data storage device comprising:
    a head;
    a disk;
    a microactuator configured to actuate the head over the disk; and
    control circuitry configured to:
       inject a sinusoid into a control signal applied to the microactuator and measure a sinusoidal response of the microactuator; and
       generate a Preisach plane based on at least two cycles of the measured sinusoidal response, wherein the Preisach plane models a hysteretic response of the microactuator.

11. The data storage device as recited in claim 10, wherein the control circuitry is further configured to:
    generate a control signal applied to the microactuator based on an input sequence u(k);
    generate compensation values y(k) based on the input sequence u(k) and the Preisach plane; and
    combine a current input $u_i$ and a current compensation value $y_i$ to generate the control signal applied to the microactuator.

12. The data storage device as recited in claim 11, wherein the compensation values y(k) compensate for the hysteretic response of the microactuator.

13. The data storage device as recited in claim 10, wherein the control circuitry is further configured to:
    adjust an offset of the sinusoid injected into the control signal applied to the microactuator; and
    after adjusting the offset, generate part of the Preisach plane based on at least two cycles of the measured sinusoidal response.

14. A method of operating a data storage device, the method comprising:
    generating a control signal applied to a microactuator based on an input sequence u(k), wherein the microactuator is configured to actuate a head over a disk;
    updating a Preisach bit map $b_j$ based on the input sequence u(k), wherein the Preisach bit map $b_j$ corresponds to a Preisach plane modeling a hysteretic response of the microactuator;
    generating a current compensation value $y_i$ based on an update value generated based on:

$$\sum_j h(j)\hat{b}_j$$

where $h_j$ represents a slice of the Preisach plane and $\hat{b}_j$ is an update bit map based on at least part of the Preisach bit map $b_j$; and combining a current input $u_i$ and the current compensation value $y_i$ to generate the control signal applied to the microactuator.

15. The method as recited in claim 14, wherein the compensation value compensates for the hysteretic response of the microactuator.

16. The method as recited in claim 14, wherein when a previous input $u_{i-1}$ is less than the current input $u_i$, the method further comprises generating the current compensation value $y_i$ by adding the update value to a previous compensation value $y_{i-1}$.

17. The method as recited in claim 14, wherein when a previous input $u_{i-1}$ is less than the current input $u_i$, the method further comprises generating the update bit map $\hat{b}_j$ based on $u_i$-$u_{i-1}$ bits of the Preisach bit map $b_j$.

18. The method as recited in claim 17, wherein the $u_i$-$u_{i-1}$ bits of the Preisach bit map $b_j$ comprise high order bits of the Preisach bit map $b_j$ having a target value.

19. The method as recited in claim 18, wherein the $u_i$-$u_{i-1}$ bits of the Preisach bit map $b_1$ comprise the high order bits of the Preisach bit map $b_1$ having a target value of 1.

20. The method as recited in claim 19, wherein after generating the update value the method further comprises clearing m high order bits of the Preisach bit map $b_j$ where m represents the $u_i$-$u_{i-1}$ high order bits of the Preisach bit map $b_j$ having a target value of 1 plus the intervening 0 bits.

21. The method as recited in claim 14, wherein when a previous input $u_{i-1}$ is greater than the current input $u_i$, the method further comprises generating the current compensation value $y_i$ by subtracting the update value from a previous compensation value $y_{i-1}$.

22. The method as recited in claim 14, wherein when a previous input $u_{i-1}$ is greater than the current input $u_i$, the method further comprises generating the update bit map $\hat{b}_j$ by inverting at least part of the Preisach bit map $b_j$.

23. A method of operating a data storage device, the method comprising:
   actuating a head over a disk using a microactuator;
   injecting a sinusoid into a control signal applied to the microactuator and measure a sinusoidal response of the microactuator; and
   generating a Preisach plane based on at least two cycles the measured sinusoidal response, wherein the Preisach plane models a hysteretic response of the microactuator.

24. The method as recited in claim 23, further comprising:
   generating a control signal applied to the microactuator based on an input sequence u(k);
   generating compensation values y(k) based on the input sequence u(k) and the Preisach plane; and
   combining a current input $u_i$ and a current compensation value $y_i$ to generate the control signal applied to the microactuator.

25. The method as recited in claim 24, wherein the compensation values y(k) compensate for the hysteretic response of the microactuator.

26. The method as recited in claim 23, further comprising:
   adjusting an offset of the sinusoid injected into the control signal applied to the microactuator; and
   after adjusting the offset, generating part of the Preisach plane based on at least two cycles the measured sinusoidal response.

\* \* \* \* \*